US005405471A

United States Patent [19]

LeMaster

[11] Patent Number: 5,405,471

[45] Date of Patent: Apr. 11, 1995

[54] SPLICING APPARATUS AND PROCESS

[76] Inventor: Timothy S. LeMaster, 2880 Holcomb Bridge Rd., Suite B9-506, Alpharetta, Ga. 30202

[21] Appl. No.: 990,981

[22] Filed: May 19, 1992

[51] Int. Cl.⁶ .......... B32B 31/00

[52] U.S. Cl. .......... 156/202; 156/216; 156/270; 156/461; 156/468; 156/577; 156/579; 156/908; 206/411

[58] Field of Search .......... 156/577, 201, 202, 216, 156/270, 461, 468, 579, 505, 908; 206/411

[56] References Cited

U.S. PATENT DOCUMENTS

| | | | |
|---|---|---|---|
| 2,213,157 | 8/1940 | Brenn | 156/202 X |
| 2,916,079 | 12/1959 | Schiefer | 156/216 X |
| 3,038,982 | 6/1962 | Ludlow | 156/202 X |
| 4,026,748 | 5/1977 | Wise et al. | 156/577 X |
| 4,401,503 | 8/1983 | Hertel | 156/202 X |
| 4,588,463 | 5/1986 | Barter et al. | 156/201 X |
| 4,750,966 | 6/1988 | Koller | 156/216 X |
| 4,792,375 | 12/1988 | Lin | 156/523 X |

FOREIGN PATENT DOCUMENTS

| | | | |
|---|---|---|---|
| 755025 | 8/1950 | United Kingdom | 156/461 |

*Primary Examiner*—Mark Osele

[57] ABSTRACT

A novel process and apparatus are provided for splicing together adjacent paper materials, in mid-air which includes placing adjacent paper materials together in an aligned position, pressing the papers together, applying tape by utilizing an apparatus which includes a tape spool on an axle, and roller, an inverted V channel, wheels and cant wheels for guiding and maintaining paper or plastic materials in a fixed position, and a cutter for severing tape, moving the apparatus along the adjacent paper materials and severing the tape.

7 Claims, 3 Drawing Sheets

SPLICING APPARATUS AND PROCESS

BACKGROUND OF THE INVENTION

This invention relates generally to the art of dispensing and, more particularly, to the art of dispensing a tape in such a way as to splice paper materials such as track-driven paper, rolls of paper, or other loose or cut sheets of paper.

Several prior patents have been directed to the splicing of track-driven paper products for the feeding thereof into processing equipment such as printers and the like. One such device is described in U.S. Pat. Nos. 4,289,556 and 4,239,582. Other relevant patents are U.S. Pat. Nos. 4,564,187; 4,525,399; 2,161,415; 2,834,557; and 3,036,751.

There has to date, however, been no completely satisfactory apparatus or method for quickly, simply and in mid-air splice together paper materials such as track-driven paper, rolls of paper, or other loose or cut sheets of paper.

SUMMARY OF THE INVENTION

It is thus an object of this invention to provide a novel process and apparatus for dispensing tape and joining together adjacent paper materials such as track-driven paper, rolls of paper, or other loose or cut sheet of paper, and in mid-air without the use of any type of stationary holder for said invention.

These as well as other objects are accomplished by placing adjacent paper materials together in an aligned position, pressing the papers together, applying tape using the tape applicator of the present invention, and severing the tape. The tape applicator according to this invention comprises a tape spool on an axle, a roller for guiding the tape, an uniquely designed inverted V channel for merging splicing tape and papers together, pressure plates as means for pressing splicing tape to papers or plastic films.

Other objects and a fuller understanding of the invention will become apparent from the following description given with reference to the various figures of drawing.

DETAILED DESCRIPTION

In accordance with this invention it has been found that adjacent paper materials such as track-driven paper, rolls of paper, or other loose or cut sheets of paper may be effectively and easily spliced together in a single operation. Various other advantages and features will become apparent from a reading of the following description given with reference to the figures of drawing.

Figure 1:
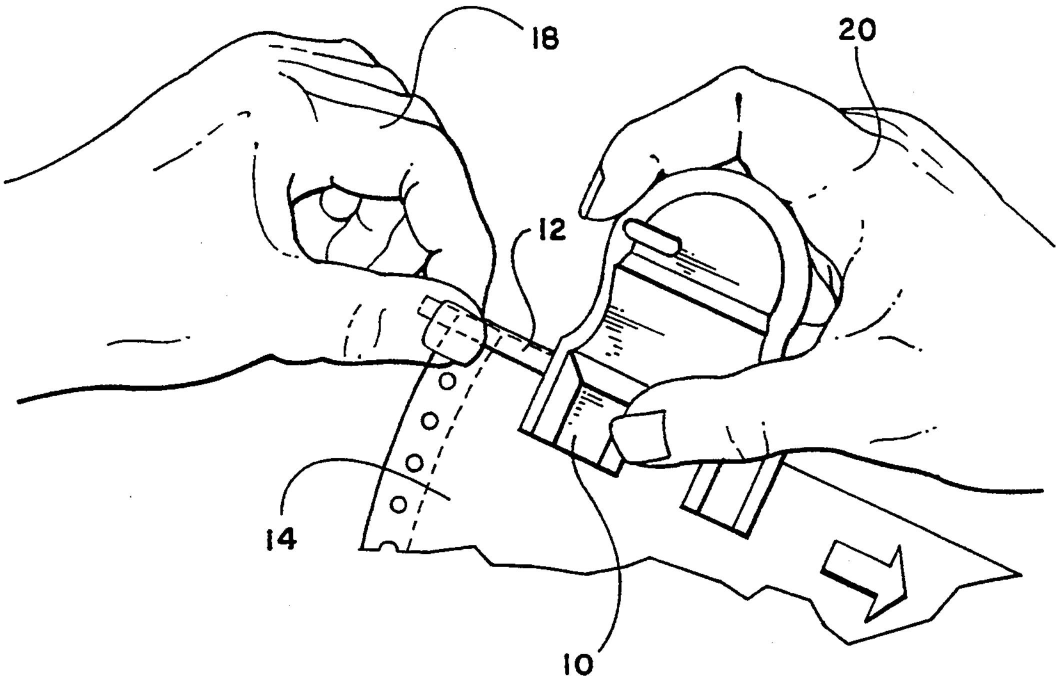
FIG. 1 is a perspective view of the apparatus according to this invention carrying out the process of this invention.

As seen in FIG. 1, the apparatus according to this invention is shown as applicator 10. Applicator 10 is shown being used to apply perforated tape 12 to join together adjacent paper materials, shown as sheets of track-driven paper. Although track-driven paper is illustrated, it is contemplated and within the scope of this invention that various paper materials such as rolls of paper or loose or cut sheets of paper may be spliced together according to this invention. As such, the use of track-driven paper herein is for illustrative purposes only.

This process of joining together adjacent paper materials 14 comprises placing adjacent paper materials 14 together in an aligned position and pressing the paper materials 14 together to fixedly position them. Tape 12 from the applicator 10 is then applied at a corner, such as shown in phantom under the left hand 18 in FIG. 1. While left hand 18 pinches the tape 12 and paper materials 14 together, the right hand 20 holds the applicator 10 and moves it across the paper materials 14 thereby adhering the sheets of paper 14 together while simultaneously maintaining the paper materials 14 in a fixed position and guiding the paper materials 14 and applicator 10. Once tape 12 has been applied to the paper materials 14, the tape 12 is then severed, leaving the paper materials 14 spliced together by the applied tape 22 as shown in FIG. 2.

Figure 2:
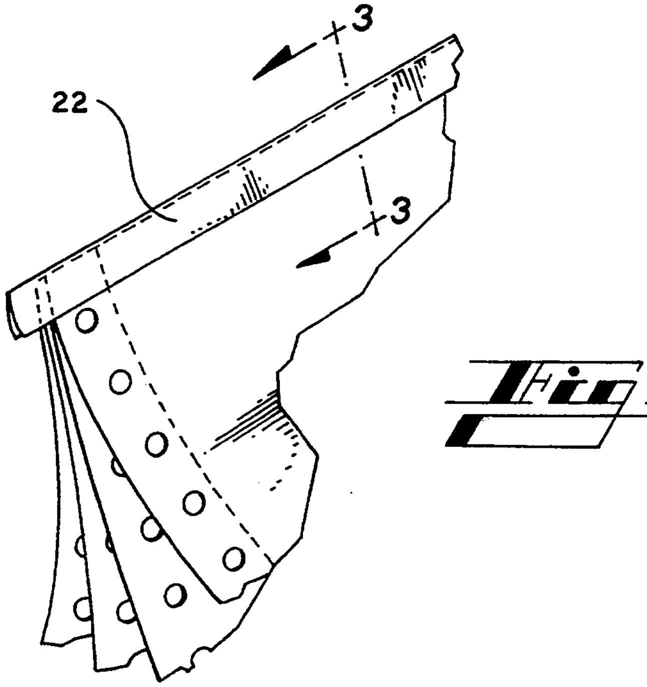
FIG. 2 is a perspective view of track-driven paper products having tape applied thereto.
Figure 3:
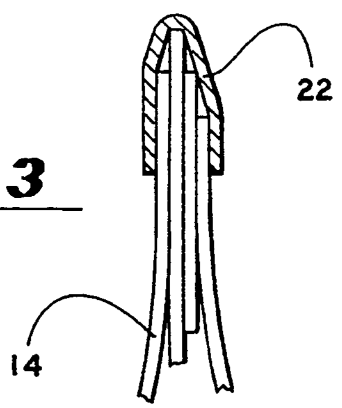
FIG. 3 is a cross sectional view taken along line 3—3 of FIG. 2 illustrating track-driven paper products having tape applied thereto.

FIG. 3 is a cross sectional view taken along line 3—3 of FIG. 2 illustrating the applied tape 22 wrapped over multiple sheets of paper materials 14. As illustrated in FIG. 3, the sheets of paper materials 14 are shingled in position so that each sheet is adhesively bonded to the tape.

Figure 4:
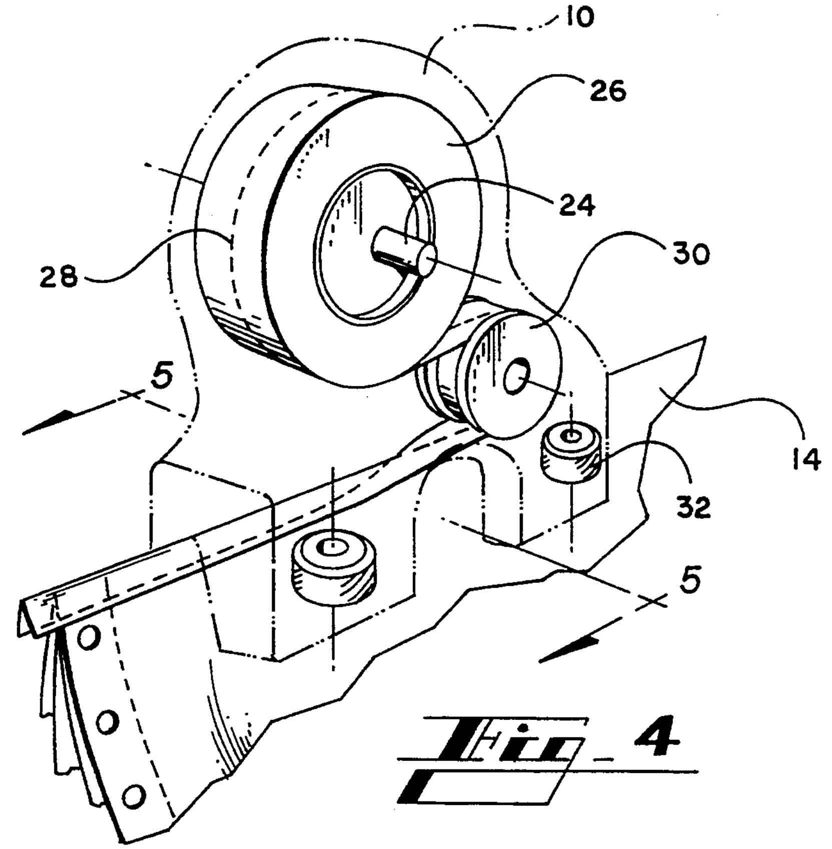
FIG. 4 is a partial schematic view of the tape applicator shown in partial phantom applying tape to track-driven papers.

Some of the working interior of applicator 10 is illustrated in FIG. 4. Applicator 10, as seen in phantom, comprises an axle 24 which holds a tape spool 26. The tape 28 from tape spool 26 is shown perforated down its center, but tape 28 winds around a roller 30 which is to guide it for application to the paper materials 14. As the tape 28 is applied, knurled wheels 32 guide the applicator 10 as the applicator 10 moves across the paper materials 14. Spring-loaded cant wheels 34, shown in FIG. 5, are positioned opposite from and press against the knurled wheels 32 so that when the tape 28 (FIG. 4) is applied, the paper materials 14 pass between the cant wheels 34 and the knurled wheels 32, thereby being simultaneously pressed together and guided providing a slight and continuous upward drive on paper materials 14 into the channel 52 (FIG. 6) for merging tape 28 and paper materials 14 together.

Figure 5:
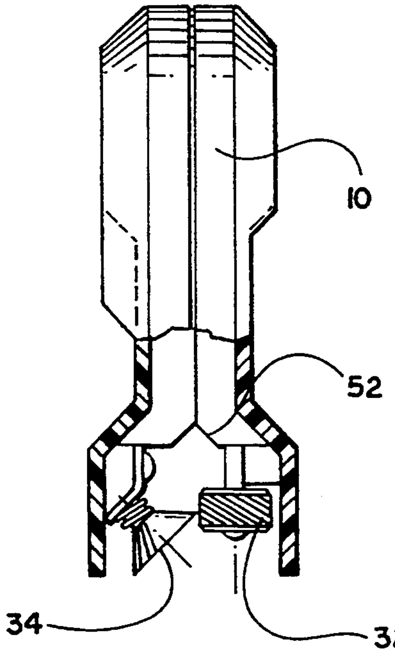
FIG. 5 is a partial cross sectional view along line 5—5 of FIG. 4 illustrating some of the interior components of the tape applicator.

FIG. 5 is a cross sectional view along the line 5—5 of FIG. 4 illustrating a spring-loaded cant wheel 34 positioned oppositely from and pressing against the knurled wheel 32. Also shown in FIG. 5 is a belt clip 36 which can optionally be attached to the applicator 10.

Figure 6:
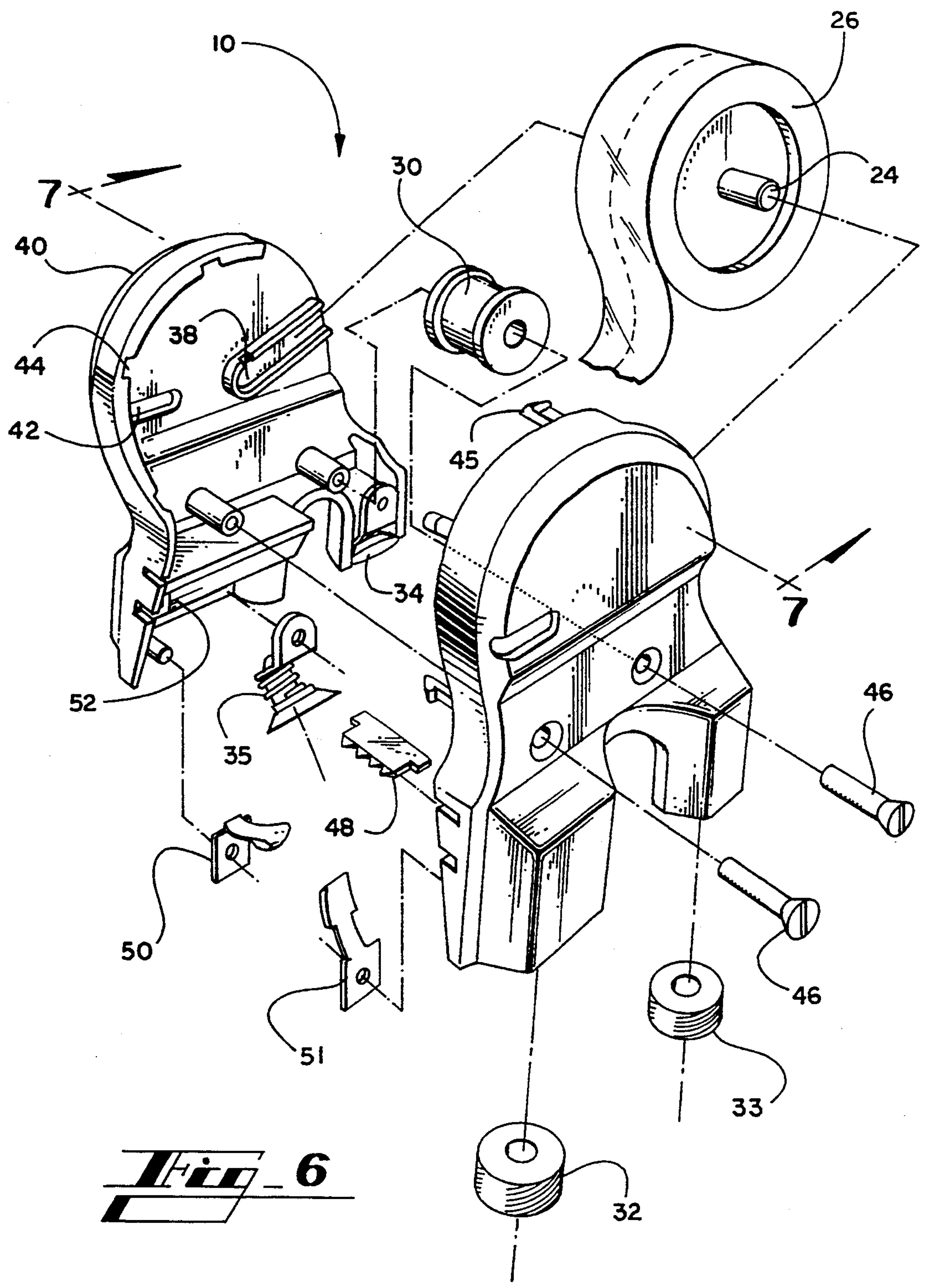
FIG. 6 is a perspective view of the assembly of the tape applicator according to the present invention.

FIG. 6 is an assembly view of the applicator 10 illustrating the applicator 10 in greater detail. Tape spool 26 is held by axle 24. The axle 24 slidably mounts into axle groove 38. The grooved roller 30 is positioned slightly below the tape spool 26. The applicator 10 is shown as comprising two separate, mating halves 40 that house the inner components. Each half 40 defines a slot or window 42 through which the tape spool 26 can be viewed when applicator 10 is fully assembled. The halves 40 snap together as indicated by snap provisions 44 and snap fingers 45 and are held securely together by means such as screws 46. Pressure plates 50 and 51 are shown as attaching to each half 40 to press tape 26 into adhesion with paper materials 14.

Further illustrated in FIG. 6 are a pair of spring-loaded cant wheels 34 and 35 and a pair of knurled wheels 32 and 33. The cant wheels 34 and 35 press against the knurled wheels 32 and 33 when applicator 10 is assembled so that as the tape 26 is applied, the paper materials 14 (in FIG. 4) pass between the cant wheels 34 and 35 and the knurled wheels 32 and 33, while simultaneously being guided and held in a fixed position. Once the tape 26 has been applied, cutting blade 48 is used to sever the tape 26.

Figure 7:
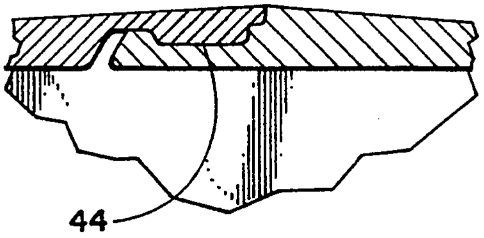
FIG. 7 is a cross section taken along line 7—7 of FIG. 6 showing an enlarged view of a snap provision utilized by the tape applicator.

FIG. 7 is a cross section taken along line 7—7 of FIG. 6 showing an enlarged illustration of the snap provisions 44 that hold the housing halves 40 together.

It is thus seen that the invention provides a novel process and apparatus for dispensing tape and joining together adjacent paper materials such as sheets of track-driven paper, rolls of paper, or other loose or cut sheets of paper has been provided. Many variations are apparent to those of skill in the art, and such variations are embodied within the spirit and scope of the present invention as measured by the following appended claims.

That which is claimed is:

1. An apparatus for applying tape to adjacent sheet materials comprising:
- an axle;
- a tape spool held by said axle;
- an inverted V channel to merge the tape and sheet materials together;
- a roller upstream of said inverted V channel for guiding said tape from said tape spool and applying said tape to said adjacent sheet materials;
- means for keeping said adjacent sheet materials in fixed position and driving the sheet materials upwards into channel while simultaneously guiding said apparatus along said adjacent sheet materials;
- means for pressing tape to the sheet materials;
- means for severing said tape;
- a detachable housing partially enclosing said axle, said tape, said roller, said means for keeping said adjacent sheet materials in a fixed position, and said means for severing said tape.

2. The apparatus of claim 1 wherein said means for keeping said adjacent sheet materials in a fixed position while simultaneously guiding said apparatus along said adjacent sheet materials comprises a pair of wheels and a pair of spring-loaded cant wheels, said wheels and said cant wheels positioned opposite from each other so that said adjacent sheet materials pass therebetween being guided by and held firmly together by said cant wheels which drive the sheet materials upward into the inverted V channel.

3. The apparatus according to claim 1 wherein said housing defines a slot through which said tape spool can be viewed and the said tape spool can be removed to insert a new roll.

4. The apparatus according to claim 1 wherein said means for severing said tape comprises a cutting blade.

5. A process for splicing adjacent sheet materials comprising the steps of:
- placing adjacent sheet materials together in an aligned position;
- pressing upon the adjacent sheet materials to fixedly position the adjacent sheet materials;
- providing an apparatus for applying tape comprising:
- a roller for applying tape to the adjacent sheet materials;
- a tape spool;
- an inverted V channel downstream of the roller to merge tape and sheet materials together;
- means for keeping adjacent sheet materials in a fixed position while simultaneously driving the said sheet materials upwards and guiding said apparatus along said adjacent sheet materials; and
- means for severing tape;
- applying said tape in a single strip adhering to the adjacent sheet materials to be spliced;
- moving said apparatus across the adjacent sheet materials thereby adhering the sheet materials together with said tape while simultaneously maintaining the fixed position of the sheet materials with said means for keeping adjacent sheet materials in a fixed position and guiding the apparatus;
- severing the tape with said means for severing to result in said sheet materials being joined together.

6. The process according to claim 5 wherein said means for keeping adjacent sheet materials in a fixed position while simultaneously guiding said apparatus along said adjacent sheet materials comprises a pair of wheels and a pair of spring-loaded cant wheels, said wheels and said cant wheels positioned opposite from each other so that said adjacent sheet materials pass there between as said tape is applied, said adjacent sheet materials being guided by and held firmly together by said cant wheels providing an upward drive on adjacent sheet materials into the inverted V channel.

7. The process according to claim 5 wherein said means for severing comprises a cutting blade.

* * * * *